(No Model.)
T. KRAUSS.
BULLION SAMPLER.
No. 537,044. Patented Apr. 9, 1895.
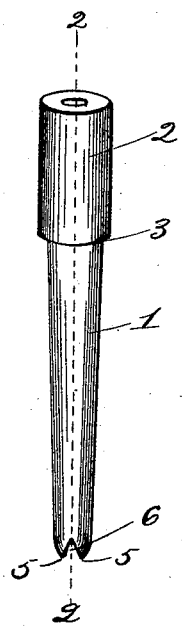
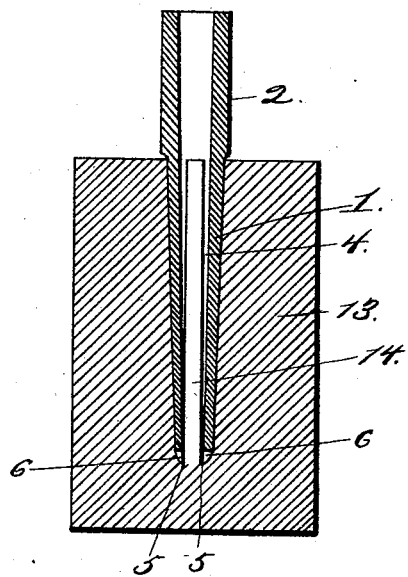
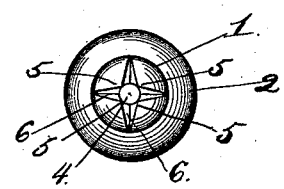
Witnesses:—
M. P. Smith.
G. Y. Thorpe
Inventor:—
Theodore Krauss.
By Higdon & Higdon
atty's

UNITED STATES PATENT OFFICE.

THEODORE KRAUSS, OF ARGENTINE, KANSAS.

BULLION-SAMPLER.

SPECIFICATION forming part of Letters Patent No. 537,044, dated April 9, 1895.

Application filed April 14, 1893. Serial No. 470,295. (No model.)

*To all whom it may concern:*

Be it known that I, THEODORE KRAUSS, of Argentine, Wyandotte county, Kansas, have invented certain new and useful Improvements in Bullion-Samplers, of which the following is a full, clear, and exact description, reference being had to the accompanying drawings, forming a part hereof.

My invention relates to appliances for obtaining reliable and correct drill samples of bullion, containing silver, gold, and lead and also copper, arsenic and antimony and other base metals; which by their predominance make the bullion or alloys of an ununiform character.

A further object of my invention is to produce an appliance that is simple, durable and inexpensive of construction, easy of manipulation and which avoids an unnecessary waste of material in sampling.

With these objects in view, my invention consists in certain peculiar and novel features of construction and arrangement, as will be hereinafter described and pointed out in the claims.

In order that my invention may be fully understood, I will proceed to describe it with reference to the accompanying drawings, in which—

Figure 1, is a perspective view of a drill for obtaining samples constructed in accordance with my invention. Fig. 2, is a central longitudinal section taken on the line 2—2 of Fig. 1, and also showing the same as applied to a brick or bar of bullion. Fig. 3, is an elevation of the same looking at the cutting end of the drill.

Referring to the drawings, 1 designates the stem of the sample drill; it being of any suitable length and circular in cross section, and is furthermore of gradually increasing external diameter from its cutting edge to its point of juncture with the shank or head 2; which may be of cylindrical form as shown or may be formed rectangular or square in cross secction. This head 2 is preferably of greater diameter than the stem, so as to form an annular shoulder 3 at its point of juncture therewith. The drill is formed throughout with a longitudinally extending smooth bore or channel 4, which is of gradually increasing diameter from the cutting end of the drill toward its head, in order that the sample bored out by the drill in the form of a cylindrical stem 14 from the mass of alloy 13, may easily pass upward without getting jammed or wedged in the bore of the drill. The size of the bore in the drill, of course, is regulated by the size of the sample desired.

5 designates triangular cutting points of the drill, formed alternately with an even number of V-shaped recesses 6 at the cutting or entering end of said drill, four of each, as shown, being preferable thus assuming a star form and each of the cutting points also assuming a triangular form with the apices of said triangles toward the center of the end of the drill, as shown in Fig. 3.

By reference to Fig. 2, it will be seen that the cutting points 5 are converged inwardly toward the axial center of the bore of the drill, and the purpose of this peculiar construction of the cutting points, which forms the essential feature of the invention, will be hereinafter explained.

The drill above described is to be made of steel or any suitable composition of sufficient hardness and temper to do the intended work.

In operation, the head of the drill is inserted in a suitable brace or drill-press and if round (as shown in drawings) is fastened by a set screw. The drill is then used like any other drill and turned into the mass of alloy to be sampled, with the necessary pressure. For this purpose, the screw device of a common drill press is most suitable, and after drilling down to the desired depth, to obtain the length of sample desired, a few reverse turns of the drill are made without any pressure, and as the result of the described inward inclination of the cutting points and the brittleness or softness of the metal or alloy being operated upon, the sample in the shape of a cylindrical rod or stem is severed or twisted from the mass of the bar or brick. This sample can then be easily removed from the head of the drill, or the sampling may be continued if a suitable receptacle is interposed between the drill and the power of pressure, so that the next sample pushes the first one up through the end of the shank and into this receptacle. This operation may be continued until the work of sampling is finished, when all the samples may be removed from said receptacle. As the drill sampler completely fills the bore hole it forms in the mass or bar of brick, owing to the taper of the shank of the drill, there is no waste of material.

It is apparent from the above description that this drill is easily and effectively worked, and is simple, durable and inexpensive of construction.

Having thus described my invention, what I claim as new, and desire to secure by Letters Patent, is—

1. A bullion-sampler, comprising a stem gradually increasing in diameter from its cutting end to its opposite end, and a shank at its upper end, and a bore extending longitudinally through the stem and shank in the drill, of gradually increasing diameter from the cutting end to the discharge end of the drill, and having cutting points formed by V-shaped recesses extending inward toward the axial center of the bore or channel, substantially as set forth.

2. A bullion-sampler comprising a stem gradually increasing in external diameter from its cutting end to its shank and a longitudinal bore or channel extending from the cutting end to the shank end of the drill and gradually increasing in diameter from the cutting end to the discharge end, and provided with a number of triangular cutting points formed alternately between V-shaped recesses extending inward toward the axial center of the bore or channel, by cross cutting the lower end of the drill, substantially as described.

In testimony whereof I affix my signature in the presence of two witnesses.

THEO. KRAUSS.

Witnesses:
 MAUD FITZPATRICK,
 M. P. SMITH.